July 24, 1951  H. E. DUNN ET AL  2,562,024
PROCESS FOR CONCENTRATING CARNOTITE ORES
Filed April 3, 1945
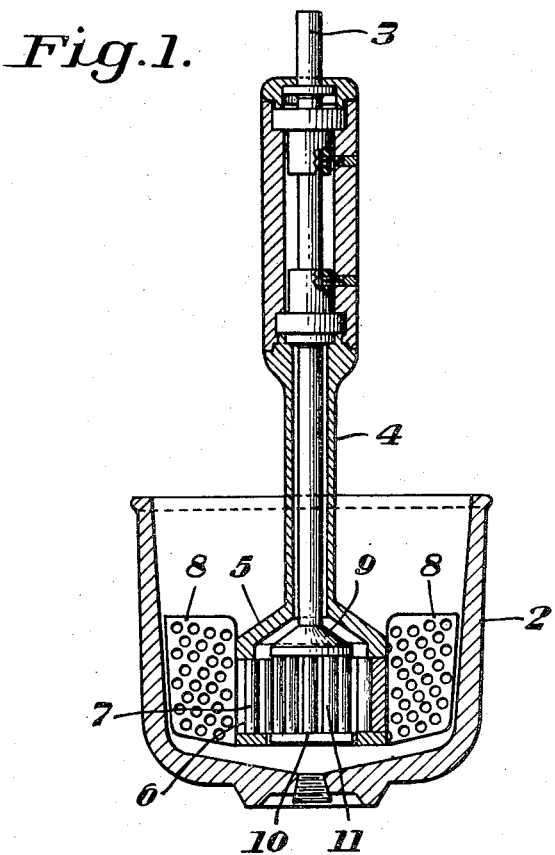
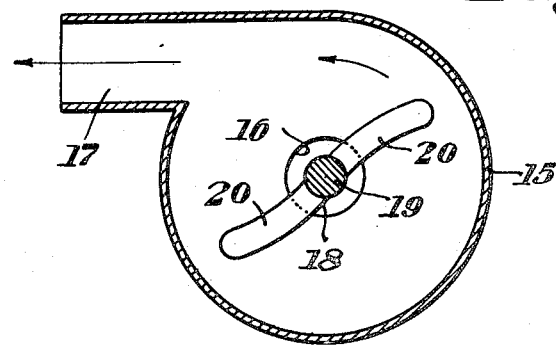
INVENTOR
Holbert E. Dunn and
William T. Bradley Patented July 24, 1951

2,562,024

UNITED STATES PATENT OFFICE 2,562,024

PROCESS FOR CONCENTRATING CARNOTITE ORES

Holbert E. Dunn, Crafton, and William T. Bradley, Carnegie, Pa., assignors to Vanadium Corporation of America, New York, N. Y., a corporation of Delaware Application April 3, 1945, Serial No. 586,372

6 Claims. (Cl. 241—14)

The present invention relates to a process of concentrating vanadium and uranium ores of the type occurring in the sandstone deposits of western United States, particularly in western Colorado, eastern Utah and northern Arizona—commonly referred to as roscoelite and carnotite ores and/or vanadiferous sandstones.

Most of these ores consist largely of sandstones impregnated with vanadium minerals. However, other ores consist largely of shale pebbles, clay films and conglomerates along the bedding planes in the ore-bearing sandstones and are rich in absorbed vanadium. Also fossil plants in and adjacent to ore bodies are in places richly mineralized. Highly selective mining is required to obtain ore of the desired milling grade. Vanadium ore of milling grade contains from about 1 to 3 or more per cent $V_2O_5$ and most of it contains less than 1 per cent $U_3O_8$, for example:

|  | Bitter Creek Carnotite Ore | Placerville Roscoelite Ore |
|---|---|---|
|  | Per cent | Per cent |
| $V_2O_5$ | 2.34 | 3.30 |
| $U_3O_8$ | 0.11 | 0.10 |
| $Al_2O_3$ | 3.63 | 3.87 |
| $CaO$ | 0.48 | 1.77 |
| $MgO$ | 1.37 | 0.47 |
| $TiO_2$ | 0.21 | MnO 0.27 |
| $Fe_2O_3$ | 1.72 | 0.50 |
| $SiO_2$ | 85.35 | 86.22 |
| Ign. Loss | 1.84 | 2.00 |
| $Cu$ | trace | trace |
| $K_2O$ | 0.64 | } 0.75 |
| $Na_2O$ | 0.34 | |
| $CO_2$ | 0.25 | |
| $SO_3$ | 0.07 | 0.042 |
| Total | 98.35 | 99.29 |

Vanadium and uranium plus the radioactive products of uranium are ordinarily the only economically important constituents of these ores, with occasionally a trace of copper and silver showing in certain localities.

Most of the ore minerals are exceedingly fine-grained and many of them intimately mixed, making mineralogic studies difficult; however, it is generally recognized that the yellow earthy mineral carnotite ($K_2O.2UO_3.V_2O_5.3H_2O$) and the yellow microcrystalline tyuyamunite $$(CaO.2UO_3.V_2O_5.4H_2O)$$

are the principal uranium-bearing minerals, while the vanadium mica, roscoelite, or at least a member of the hydrous mica group $$2K_2O.3RO.8R_2O_3.24SiO_2.12H_2O$$

(in which R is a metal) is the principal vanadium mineral. Vanoxite ($2V_2O_4.V_2O_5.8H_2O$), corvusite ($V_2O_4.6V_2O_5.nH_2O$) black and blue-black crystalline minerals, brown fervanite $$(2Fe_2O_3.2V_2O_5.5H_2O)$$

red hewettite ($CaO.3V_2O_5.9H_2O$), bright orange pascoite ($2CaO.3V_2O_5.11H_2O$) and light yellow rossite ($CaO.V_2O_5.4H_2O$) in varying minor amounts along with varying amounts of green chlorite, gypsum and calcite, the two latter often in appreciable quantities together with the 75 to 85 per cent of silica sand are known to make up the composition of the milling ores.

As described by one of the present inventors in Patent 2,175,484, it has been customary in treating these ores either by dry or wet process to prepare the ore for concentration by breaking it to from 40 to 80 mesh in crushers and rod mills in order to free the sand grains. Further attrition is then applied to the 40 to 80 mesh grains to rub, scrub or abrade adhering mineral which often sticks fast to even the smooth surface of a sand grain. When the ores are broken down to single grain size, an appreciable portion of the values are present as free grains of the same size order as the gangue grains of sand, and a certain portion of these can be recovered by electromagnetic separation after having been freed of fines by air classification.

Prior to the present invention, simple desliming or scrubbing of the sand grains has been accomplished variously, as by revolving tank or trommel provided with a mechanical rubbing device, ball mills provided with special grinding media, such as metal slugs, rubber or porcelain balls, impact pulverizer, hammer mill, rubber-lined beater-mills, and even wire brushes acting between revolving steel plates. In carrying out a simple desliming or wet scrubbing operation, the object is merely to separate the particles in the pulp into different sized particles. It is merely the equivalent of a wet screening operation. The amount of agitation imparted to the pulp and the time of agitation are sufficient only to enable separation of the particles into the desired size ranges, and neither the degree of agitation nor the time of agitation is sufficient to materially disintegrate the particles. In a simple desliming operation where an open bowl and a stirrer extending into the pulp are employed, the speed of operation of the stirrer is of the order of 10 to 70 R. P. M. In simple desliming if a revolving tank or trommel is used instead of a stirrer, the revolving tank or trommel revolves at a speed of the order of 10 to 70 R. P. M., and here again the object is merely to enable the separation of different sized particles from each other without appreciably disintegrating any of the particles.

Preferential pneumatic grinding and scrubbing as described by one of the present inventors in Patent 2,175,457, is also efficacious in this step—so much so that the Bitter Creek ore, when pneumatically scrubbed, air-separated, and the sands electrostatically cleaned, will yield 75 per cent of the vanadium values and about 88.5 per cent of the uranium values in a concentrate assaying 9.05 per cent $V_2O_5$ and 0.46 per cent $U_3O_8$ and a tailing at 0.73 per cent $V_2O_5$ and 0.016 per cent $U_3O_8$. However, this tailing amounts to 80 per cent of the ore feed weight and, in comparison to the leached discard tailings of existing salt roasting operations ranging from 0.20 to 0.30 per cent $V_2O_5$, is entirely too rich to discard. By wet tabling, such tailings can be lowered to 0.54 per cent $V_2O_5$ and 0.015 per cent $U_3O_8$ but the concentrate is degraded to 6.35 per cent $V_2O_5$ and 0.31 per cent $U_3O_8$.

Microscopic examination of such tailings obtained by wet tabling discloses thoroughly scrubbed sand grains, interspersed with an appreciable fraction of equisized light to dark brown resinous particles, which under direct pressure show a hardness much less than the sand grains but which are so resilient as to resist all ordinary means of comminution when so dispersed, short of breaking the sand grains themselves. These dark particles when isolated for chemical analysis range from 2 to 12 per cent $V_2O_5$, and in heavy liquid separation appreciably overlap the quartz range, and by petrographic tests are found to be soft gray to brown microcrystalline aggregates whose properties correspond to glauconite (hydrous potassium iron silicate), and which are speckled with black, almost opaque, vanadium mineral inclusions which become progressively more numerous as the density increases, and which are believed to be corvusite.

Failure to recognize the importance of this gangue mineral, glauconite, as a potential vanadium carrier and to differentiate between its physical characteristics in contrast to the principal gangue material, silica sand, is believed to have been a basic difficulty in previous efforts to feasibly concentrate the vanadium and uranium ores of the western sandstone deposits.

Considering the tenacity with which the vanadium-bearing glauconite has heretofore persistently resisted sliming or finer grinding than the sand grains, or to otherwise be concentrated along with the principal vanadium minerals, we believe that an outstanding advancement in the art has been made in our discovery that the above-mentioned results of "simple desliming" can be so greatly augmented as to obviate the need for any other concentrating procedure on the run-of-mine ore of many of the known deposits of carnotite and roscoelite.

The process of the present invention relates to the treatment of ores occurring in sandstone deposits for the purpose of concentrating the vanadium and uranium values. The ores are of the type in which the metal values (vanadium and uranium or either of them) are often associated with gangue minerals which, like the mineral values, are softer than the sand grains. For example, the softer gangue minerals may consist largely of glauconite or they may contain in addition to the glauconite, a substantial amount of calcite and/or dolomite. In carrying out the process the ore is crushed and ground to free the minerals. This may be accomplished by crushing and grinding the ore to produce a size distribution corresponding approximately to the natural grain size distribution of the sandstone which is usually between approximately 35 to 150 mesh per lineal inch. The ground ore is then made into an aqueous pulp and the pulp is subjected to intensive turbulent agitation for a period of time required to effect attrition of the major part of the soft gangue minerals by the harder silica sand grains to a particle size smaller than 200 mesh per lineal inch and preferably to a particle size smaller than 325 mesh per lineal inch. The density of the ore pulp which is subjected to intensive turbulent agitation is preferably between 10 and 60 per cent solids, but this may be varied in order to produce the most efficient attrition of the soft gangue minerals by the silica grains. The intensive turbulent agitation of the aqueous ore pulp also is carried out for a time sufficient to scrub the sand grains substantially free of vanadium and uranium mineral encrustations. By this process of intensive turbulent agitation, the vanadium and uranium values associated with the glauconite or other relatively soft gangue mineral is ground to a size such that it can be obtained in the concentrate, but the harder particles of silica are not ground to such an extent as to greatly degrade the concentrate. After the intensive turbulent agitation has been carried out for the required time, the ore pulp is deslimed in any manner that will separate the pulp into a concentrate having a particle size smaller than 200 meshes per inch, preferably smaller than 325 meshes per inch, and into tailings having a larger particle size. The concentrate contains practically all of the vanadium and uranium values and the tailings contain very little of these values. The slime containing the valuable fines is then dewatered in any suitable manner, as by filtering or centrifuging, and may be used in the regular salt roasting and leaching process commonly practiced on the ores themselves.

The intensive turbulent agitation of the aqueous ore pulp employed according to our invention is such as to effect attrition of at least the major part of the glauconite or other soft gangue minerals, as contrasted with simple desliming in which no appreciable disintegration of glauconite is obtained. In the intensive turbulent agitation of the present invention, stirrer speeds of the order of 500 to 3600 R. P. M. are employed, as contrasted with stirrer speeds of the order of 10 to 70 R. P. M. employed in simple desliming.

The intensive turbulent agitation of the aqueous ore pulp which is characteristic of the present invention, as contrasted with simple desliming of an aqueous ore pulp, may be obtained by using various types of apparatus, two types for obtaining the intensive turbulent agitation being shown in the drawings as examples only. Figure I is a vertical section of a Fagergren flotation cell, parts being shown in elevation, and Figure II is a diagrammatic illustration of a simple centrifugal pump.

The following are examples of our process:

EXAMPLE I

Bitter Creek carnotite ore at 2.34 per cent $V_2O_5$ was dry ground in a ball mill to a fineness such that 93 per cent passed at 65 mesh screen. The ground ore was then divided into three samples, Nos. 1, 2 and 3. Sample 1 was sized on a series of screen ranging from 65 to 325 meshes per lineal inch. In treating sample 1 water was flowed through the screens. The treatment of sample 1 was equivalent to a simple desliming operation without subjecting the ore to intensive turbulent agitation. The ground ore samples 2 and 3 were pulped with water to 20 per cent solids and the pulps were agitated in a high-speed agitating machine, such as the Fagergren flotation cell, capable of producing high turbulence of flow at 1750 R. P. M. Sample 2 was agitated in the Fagergren flotation cell for a period of 90 minutes and sample 3 for a period of 180 minutes. The pulps of samples 2 and 3 were then screened on a series of screens of 65 to 325 meshes per lineal inch and the different sized particles were separated and analyzed with the following results:

*Table I*

| Tyler Mesh | Sample 1 | | | Sample 2, 90 Min. Agitation | | | Sample 3, 180 Min. Agitation | | |
|---|---|---|---|---|---|---|---|---|---|
| | Per Cent Weight | Per Cent $V_2O_5$ Assay | Per Cent Total V | Per Cent Weight | Per Cent $V_2O_5$ Assay | Per Cent Total V | Per Cent Weight | Per Cent $V_2O_5$ Assay | Per Cent Total V |
| On 65 | 6.53 | 0.50 | 1.40 | 4.05 | 0.14 | 0.23 | 3.85 | 0.13 | 0.23 |
| On 100 | 25.13 | 0.55 | 6.08 | 23.28 | 0.13 | 1.23 | 24.49 | 0.12 | 1.21 |
| On 150 | 27.64 | 0.68 | 8.18 | 28.54 | 0.16 | 2.00 | 26.92 | 0.14 | 1.66 |
| On 200 | 11.56 | 0.98 | 4.98 | 11.74 | 0.23 | 1.15 | 12.15 | 0.21 | 1.13 |
| On 325 | 7.04 | 1.46 | 4.52 | 6.07 | 0.46 | 1.23 | 5.87 | 0.32 | 0.83 |
| Pass 325 | 22.10 | 7.76 | 74.84 | 26.32 | 8.30 | 94.16 | 26.72 | 8.39 | 94.94 |
| Composite +325 | 77.90 | 0.77 | 25.16 | 73.68 | 0.18 | 5.84 | 73.28 | 0.16 | 5.06 |

It is obvious from the above data that the slime concentrate separated at 325 mesh by down size, as in samples 2 and 3, has been improved in grade, with the benefit of 20 per cent additional recovery over the "simple desliming" of sample 1. This follows from the fact that in sample 1 the per cent total V in the slime concentrate was 74.84, whereas in samples 2 and 3 it was 94.16 and 94.94 per cent. In sample 1 the sand tailing (plus 325 mesh) amounted to 77.90 per cent at an assay of 0.77 per cent $V_2O_5$ and could not be discarded and still have an economic operation. On the other hand, in samples 2 and 3 the sand tailing (plus 325 mesh) amounted to about 73 per cent of the ore feed weight at an assay of 0.16 to 0.18 per cent $V_2O_5$, which can readily be discarded as useless. Thus the process of samples 2 and 3 converts 3.8 tons of ore at 2.34 per cent $V_2O_5$ into one ton of concentrate at 8.30 per cent $V_2O_5$ at a recovery of 94.16 per cent of the vanadium. The recovery of uranium by this process also is high. In this test it was 93.15 per cent. It will be noted further from Table I that in sample 1 about 22 per cent by weight was finer than 325 mesh, whereas in samples 2 and 3 about 26 per cent was finer than 325 mesh. Also, that in sample 1 the per cent total V in the material finer than 325 mesh was about 74 per cent, as contrasted with about 94 per cent total V in samples 2 and 3. Thus the intensive turbulent agitation of samples 2 and 3 resulted in an increase of about 4 per cent in the slime concentrate separated at 325 mesh, but that this 4 per cent of concentrate contained 20 per cent of the vanadium. The importance of the intensive turbulent agitation thus becomes apparent.

Referring to Figure 1, the pulp is contained in a relatively shallow open-topped bowl 2. A shaft 3 is enclosed in a stand pipe 4 which at its lower end 5 supports a stator 6. This stator is a cage formed of spaced bars 7. Perforated baffle plates 8 also are secured to the lower part 5 of the stand pipe 4. The lower end of the shaft 3 has a fitting 9 to which is connected a rotor 10. This rotor is in the form of a cage made up of the spaced bars 11. The inner cage or rotor 10 rotates within the outer cage or stator 6. The action of the rotor, stator and perforated baffles 8 results in intensive turbulent agitation of the ore pulp.

Another form of apparatus which may be employed in obtaining the intensive turbulent agitation of the aqueous ore pulp is a simple centrifugal pump of the type shown in Figure 2. The pump has a casing 15 provided with an inlet 16 at the center and an outlet 17. An impeller 18 is mounted on a shaft 19. In the embodiment shown, the impeller has two blades 20. The pump is of a design which would be very inefficient if the object was to obtain high pumping capacity. The pump, however, has a high disintegrating capacity for liquids. The slip of the pump is of a high order as contrasted with the slip found in pumps of high pumping efficiency. Whereas, pumps designed for high pumping efficiency have a slip of the order of 4 to 7 per cent, the pump used according to the present invention for obtaining intensive turbulent agitation has a slip which is of a high order and in the embodiment shown in Figure 2 the slip is of the order of 30 or 40 per cent. In order to obtain the intensive turbulent agitation, the ends of the blades 20 are spaced a substantial distance from the casing 15. For example, in a pump having a casing of the order of 10" in diameter, the clearance between the end of the blade and the casing may be of the order of 1". When this pump is operated at a speed of 500 R. P. M. the velocity of the propeller tip is approximately 1050 feet per minute and when the pump is operated at a sped of 3600 R. P. M. the propeller tip has a velocity of about 7560 feet per minute.

Once the proper amount of agitation for a given system has been established. the problem then becomes one of economics in design of this agitating device for minimum power consumption. Any other type of stirrer or pump which provides intensive turbulent agitation as contrasted with simple desliming may be employed in carrying out our process. The pulp density is preferably such as to permit maximum bombardment of the glauconite grains by the sand grains.

EXAMPLE II

A 25 per cent solids pulp of the Bitter Creek ore ground to 93 per cent to pass 65 mesh was continuously recirculated through a simple centrifugal pump of the type shown in Figure 2 having a simple 2-blade impeller formed by a sigma-formed bar rotating on its central axis at a speed of 1725 R. P. M. (3622 feet per minute tip velocity). The circulation of the pulp was continued for various periods of time and the following results were obtained after wet screening over a 325 mesh screen:

*Table II*

| Agitation Time, Min. | Plus 325 Mesh-Tailings | | | Minus 325 Mesh-Concentrate | | |
|---|---|---|---|---|---|---|
| | Per Cent Weight | Per Cent $V_2O_5$ | Vanadium, Per Cent Distribution | Per Cent Weight | Per Cent $V_2O_5$ | Vanadium, Per Cent Distribution |
| 0 | 77.90 | 0.77 | 25.16 | 22.10 | 7.78 | 74.84 |
| 7½ | 77.00 | 0.34 | 11.61 | 23.00 | 8.63 | 88.39 |
| 15 | 75.76 | 0.23 | 7.56 | 24.24 | 8.72 | 92.35 |
| 30 | 75.50 | 0.20 | 6.60 | 24.50 | 8.55 | 93.40 |
| 60 | 75.25 | 0.18 | 5.91 | 24.75 | 8.63 | 94.09 |
| 90 | 74.50 | 0.16 | 5.24 | 25.50 | 8.48 | 94.76 |

A comparison of the results of Tables I and II shows that substantially the same results are obtained whether a flotation cell of the Fagergren type or a simple centrifugal pump is employed. Thus the per cent concentrate passing the 325 mesh screen, the per cent tailings retained on the 325 mesh screen, the percentage of vanadium in the concentrate and in the tailings when the intensive turbulent agitation has been carried out for 90 minutes, whether with the Fagergren flotation cell or with the simple centrifugal pump, are very similar.

Microscopic examination of the 90-minute tailings showed practically no glauconite and the sand grains to be scrubbed free of adhering carnotite.

On a low-grade Cottonwood carnotite ore, assaying 1.16 per cent $V_2O_5$, equally effective results were obtained after 90 minutes pump circulation followed by 325 mesh desliming to give a slime concentrate assaying 4.93 per cent $V_2O_5$ and containing 94.77 per cent of the vanadium while the sand tailings amounting to 79 per cent by weight, showed an assay of only 0.07 per cent $V_2O_5$. Simple desliming at 325 mesh showed a sand tailing assay of 0.77 per cent $V_2O_5$ carrying 63.61 per cent of the vanadium contained in the ore, which from an economic standpoint could not possibly be discarded.

Similarly, a sample of the Placerville roscoelite ore at 3.50 per cent $V_2O_5$, when ground to 85 per cent to pass 100 mesh and pulped in water to 20 per cent solids and circulated for 180 minutes through the centrifugal pump, and then deslimed at 325 mesh size, yielded a slime concentrate assaying 10.54 per cent $V_2O_5$ and containing 96.03 per cent of the vanadium while the sand tailings, amounting to 68.00 per cent by weight, assayed 0.21 per cent $V_2O_5$. Microscopic examination of the tailings disclosed a very small amount of glauconite remaining in the tailings and the sand grains to be quite clean.

A much lower grade roscoelite ore, assaying 1.86 per cent $V_2O_5$, treated in the same manner as just described, yielded a concentrate analyzing 5.70 per cent $V_2O_5$ at 93.15 per cent vanadium recovery and a sand tailing analyzing 0.17 per cent $V_2O_5$ after only 90 minutes' circulation through the pump.

In treating carnotite ores from certain districts, notably East Reservation and Monument, in which the gangue is found to consist of sandstone, fine quartz conglomerate, and substantial amounts of calcite, as much as 5 to 10 per cent of their vanadium content may be soluble in the water used for pulping the ore in our preferred process, and would otherwise be lost to the process were means not provided to prevent it. For example, an ore analyzing:

| | Per cent |
|---|---|
| $V_2O_5$ | 3.46 |
| $SiO_2$ | 78.53 |
| CaO | 3.42 |
| MgO | 0.75 |
| $Al_2O_3$ | 2.39 |
| $Fe_2O_3$ | 1.75 |
| $CO_2$ | 2.98 |
| CuO | 0.29 |
| $U_3O_8$ | 0.32 |
| $TiO_2$ | 0.20 | was ground to 60 per cent to pass 100 mesh and pulped to 20 per cent solids in water, and circulated through the scrubbing pump for a period of 90 minutes and then deslimed at 325 mesh size and dewatered by filtering. The slime concentrate was found to assay 9.88 per cent $V_2O_5$ with a recovery of 83.54 per cent, and the sand tailing to analyze 0.46 per cent $V_2O_5$ containing 9.81 per cent of the total vanadium while the water solubility loss amounted to 6.65 per cent of the total vanadium. In another example the same procedure was repeated through the desliming step, the sand tailings thereby removed, and the slimes instead of being directly filtered were agitated for 30 minutes with 50 to 100 pounds of pulverized lime per ton of ore and then filtered. The lime caused an intense flocculation of the slimes after agitation, and accelerated their filtration rate markedly—from 6 to 10 times as fast as when no lime was used. The slimes were found to analyze 9.97 per cent $V_2O_5$ with a vanadium recovery of 93.08 per cent, and the sands assayed 0.34 per cent $V_2O_5$ and contained 6.92 per cent of the total vanadium while the water was entirely free of vanadium. Other flocculating agents may be used in place of or in addition to lime. Any of the water-soluble salts of calcium, magnesium, aluminum, iron or other metals which form insoluble vanadates and which are not objectionable in the subsequent steps of roasting and leaching the concentrates may be employed. Examples of suitable flocculating agents are calcium or magnesium oxide or hydroxide or aluminum or ferric sulphate.

The process as described has been found highly efficacious in concentrating the vanadium and uranium ores occurring in the sandstone deposits of western United States but the normally high ratio of concentration (tons ore to tons concentrate) may be greatly reduced when the normal sandstone gangue of the ore suffers extensive replacement by calcite and/or dolomite, unless these soft, readily-sliming minerals are previously removed by other means.

We have illustrated and described the preferred manner of carrying out the process. Some of the steps may be omitted under certain circumstances. Thus the addition of lime or other flocculating agent before dewatering the slime pulp is not absolutely essential for the success of the process unless a substantial amount of water-soluble vanadium is present in the ore. However, its use greatly accelerates the filtration rate of the slimes, degrades the concentrate but little, and offers no complication in subsequent utilization of the concentrate in the regular salt roasting and leaching processes commonly practiced on the ores.

We claim:

1. In a process for concentrating vanadium and uranium ores occurring in sandstone deposits and containing a substantial amount of glauconite with which some of the metal values are associated, the steps comprising crushing and grinding the ore to approximately the single grain size range of the sandstone, thereby producing sand grains coated with metal values and discrete particles of glauconate containing metal values, forming an aqueous pulp of the ground ore having a solids concentration between 10 and 60% by weight, agitating the pulp at a velocity sufficiently high that the impact forces pulverize the discrete particles of glauconite while leaving the sand grains substantially intact, carrying out such agitation until the major part of the glauconite is reduced to particle size smaller than 200 mesh per lineal inch and the sand grains are scrubbed so that they contain not over about 0.30% V2O5, separating the slime of valuable fines having a particle size smaller than 200 mesh per lineal inch from the coarser tailings, and dewatering the slime.

2. In a process for concentrating vanadium and uranium ores occurring in sandstone deposits and containing a substantial amount of glauconite with which some of the metal values are associated, the steps comprising crushing and grinding the ore to a size distribution between approximately 35 to 150 mesh per lineal inch, thereby producing sand grains coated with metal values and discrete particles of glauconite containing metal values, forming an aqueous pulp of the ground ore having a solids concentration between 10 and 60% by weight, agitating the pulp at a velocity sufficiently high that the impact forces pulverize the discrete particles of glauconite while leaving the sand grains substantially intact, carrying out such agitation until the major part of the glauconite is reduced to particle size smaller than 325 mesh per lineal inch and the sand grains are scrubbed so that they contain not over about 0.30% V2O5, separating the slime of valuable fines having a particle size smaller than 325 mesh per lineal inch from the coarser tailings, and dewatering the slime.

3. In a process for concentrating vanadium and uranium ores occurring in sandstone deposits and containing a substantial amount of glauconite with which some of the metal values are associated, the steps comprising crushing and grinding the ore to approximately the single grain size range of the sandstone, thereby producing sand grains coated with metal values and discrete particles of glauconite containing metal values, forming an aqueous pulp of the ground ore having a solids concentration between 10 and 60% by weight, agitating the pulp at a velocity sufficiently high that the impact forces pulverize the discrete particles of glauconite while leaving the sand grains substantially intact, carrying out such agitation until the major part of the glauconite is reduced to particle size smaller than 200 mesh per lineal inch and the sand grains are scrubbed so that they contain not over about 0.30% V2O5, separating the slime of valuable fines having a particle size smaller than 200 mesh per lineal inch from the coarser tailings, adding to said slime an agent in amount sufficient to accomplish the dual functions of precipitating the vanadium and flocculating the slime, and dewatering the slime.

4. In a process for concentrating vanadium and uranium ores occurring in sandstone deposits and containing a substantial amount of glauconite with which some of the metal values are associated, the steps comprising crushing and grinding the ore to approximately the single grain size range of the sandstone, thereby producing sand grains coated with metal values and discrete particles of glauconite containing metal values, forming an aqueous pulp of the ground ore having a solids concentration between 10 and 60% by weight, subjecting the pulp to intensive turbulent agitation by recirculating the pulp through a centrifugal pump having a high disintegrating capacity for liquids and a low pumping efficiency to pulverize the discrete particles of glauconite while leaving the sand grains substantially intact, carrying out such agitation until the major part of the glauconite is reduced to particle size smaller than 325 mesh per lineal inch and the sand grains are scrubbed so that they contain not over about 0.30% V2O5, separating the slime of valuable fines having a particle size smaller than 325 mesh per lineal inch from the coarser tailings, and dewatering the slime.

5. In a process for concentrating vanadium and uranium ores occurring in sandstone deposits and containing a substantial amount of glauconite with which some of the metal values are associated, the steps comprising crushing and grinding the ore to approximately the single grain size range of the sandstone, thereby producing sand grains coated with metal values and discrete particles of glauconite containing metal values, forming an aqueous pulp of the ground ore having a solids concentration between 10 and 60% by weight, subjecting the pulp to intensive turbulent agitation by recirculating the pulp through a chamber by an impeller having a high disintegrating capacity for liquids and a large amount of slippage to pulverize the discrete particles of glauconite while leaving the sand grains substantially intact, carrying out such agitation until the major part of the glauconite is reduced to particle size smaller than 200 mesh per lineal inch and the sand grains are scrubbed so that they contain not over about 0.30% V2O5, separating the slime of valuable fines having a particle size smaller than 200 mesh per lineal inch from the coarser tailings, and dewatering the slime.

6. In a process for concentrating vanadium and uranium ores occurring in sandstone deposits and containing a substantial amount of glauconite with which some of the metal values are associated, the steps comprising crushing and grinding the ore to approximately the single grain size range of the sandstone, thereby producing sand grains coated with metal values and discrete particles of glauconite containing metal values, providing a body of an aqueous pulp having a solids concentration of about 10 to 60%, of the ground ore, moving an impeller through said body at a peripheral speed of at least about 10.50 feet per minute and at each revolution of said impeller displacing from said body a portion of said body not exceeding about 70% by volume of said body, returning said displaced portion to the remaining portion of said body and continuing said operation for a period of time required to pulverize the major part of the glauconite by the harder silica sand grains to a particle size smaller than 325 mesh per lineal inch and to scrub the sand grains so that they contain not over about 0.30% V$_2$O$_5$, without substantial attrition of the silica sand grains, separating the valuable fines having a particle size smaller than 325 mesh per lineal inch from the coarser tailings, and dewatering the valuable fines.

HOLBERT E. DUNN.
WILLIAM T. BRADLEY.

REFERENCES CITED

The following references are of record in the file of this patent:

UNITED STATES PATENTS

| Number | Name | Date |
|---|---|---|
| 1,195,698 | McCoy | Aug. 22, 1916 |
| 1,429,550 | Vogt | Sept. 19, 1922 |
| 1,430,864 | Thews | Oct. 3, 1922 |
| 1,512,635 | Piersol | Oct. 21, 1924 |
| 1,846,220 | McCune, Jr. | Feb. 23, 1932 |
| 1,963,122 | Fagergren | June 19, 1934 |
| 2,054,249 | Fagergren | Sept. 15, 1934 |
| 2,047,798 | Patek | July 14, 1936 |
| 2,075,466 | Queneau | Mar. 30, 1937 |
| 2,136,726 | Osborne | Nov. 15, 1938 |
| 2,173,523 | Nye | Sept. 19, 1939 |
| 2,175,484 | Rees | Oct. 10, 1939 |
| 2,216,040 | Mead | Sept. 24, 1940 |
| 2,245,632 | Winkler | June 17, 1941 |
| 2,371,681 | Durdin, Jr. | Mar. 20, 1945 |

FOREIGN PATENTS

| Number | Country | Date |
|---|---|---|
| 763 | Great Britain | Oct. 12, 1911 |
| 195,113 | Great Britain | Mar. 29, 1923 |
| 233,842 | Great Britain | May 21, 1925 |

OTHER REFERENCES

Engineering and Mining Journal, November 1938, page 45, volume 139, July–December 1938. Patent Office designation TN–1–E7. Published by McGraw-Hill Pub. Co. Copy in Scientific Library.

Milling Methods 1939, pages 67 and 78. Transactions of the American Institute of Mining and Metallurgical Engineer, volume 134, published by the Institute, 29 West 39th St., New York. Patent Office copy in Division 25. Patent Office designation TN–1–A47.

Certificate of Correction

Patent No. 2,562,024

July 24, 1951

HOLBERT E. DUNN ET AL.

It is hereby certified that error appears in the printed specification of the above numbered patent requiring correction as follows:

Column 4, line 7, for "35 to 150" read *35 and 150*; line 74, for "passed at" read *passed a*; column 6, line 52, for "sped" read *speed*; column 9, line 26, for "glauconate" read *glauconite*; column 11, line 5, "10.50" read *1050*; and that the said Letters Patent should be read as corrected above, so that the same may conform to the record of the case in the Patent Office.

Signed and sealed this 13th day of November, A. D. 1951.

[SEAL]

THOMAS F. MURPHY,
*Assistant Commissioner of Patents.*